(12) United States Patent
Southwell

(10) Patent No.: US 10,557,078 B2
(45) Date of Patent: Feb. 11, 2020

(54) BRINE RESISTANT SILICA SOL

(71) Applicant: Nissan Chemical America Corporation, Houston, TX (US)

(72) Inventor: John Edmond Southwell, Glen Ellyn, IL (US)

(73) Assignee: NISSAN CHEMICAL AMERICA CORPORATION, Houston, TX (US)

( * ) Notice: Subject to any disclaimer, the term of this patent is extended or adjusted under 35 U.S.C. 154(b) by 0 days.

(21) Appl. No.: 16/374,060

(22) Filed: Apr. 3, 2019

(65) Prior Publication Data
US 2019/0225871 A1 Jul. 25, 2019

Related U.S. Application Data

(63) Continuation of application No. 15/946,252, filed on Apr. 5, 2018.

(60) Provisional application No. 62/482,429, filed on Apr. 6, 2017, provisional application No. 62/482,470, filed on Apr. 6, 2017, provisional application No. 62/482,461, filed on Apr. 6, 2017.

(51) Int. Cl.
| | |
|---|---|
| *C09K 8/588* | (2006.01) |
| *C09K 8/68* | (2006.01) |
| *C09K 8/86* | (2006.01) |
| *C09K 8/88* | (2006.01) |
| *C09K 8/03* | (2006.01) |
| *C09K 8/60* | (2006.01) |
| *C09K 8/66* | (2006.01) |
| *C09K 8/84* | (2006.01) |
| *C09K 8/90* | (2006.01) |
| C09K 8/72 | (2006.01) |

(52) U.S. Cl.
CPC ............... *C09K 8/588* (2013.01); *C09K 8/03* (2013.01); *C09K 8/604* (2013.01); *C09K 8/665* (2013.01); *C09K 8/68* (2013.01); *C09K 8/845* (2013.01); *C09K 8/86* (2013.01); *C09K 8/88* (2013.01); *C09K 8/905* (2013.01); *C09K 8/72* (2013.01); *C09K 2208/10* (2013.01)

(58) Field of Classification Search
CPC .............. C09K 2208/10; C09K 11/025; C09K 11/0883; C09K 11/7734; C09K 3/1409; C09K 5/10; C09K 5/20; C09K 8/03; C09K 8/572; C09K 8/5751; C09K 8/5755; C09K 8/588; C09K 8/604; C09K 8/665; C09K 8/68; C09K 8/72; C09K 8/725; C09K 8/74; C09K 8/845; C09K 8/86; C09K 8/905
See application file for complete search history.

(56) References Cited

U.S. PATENT DOCUMENTS

| | | | |
|---|---|---|---|
| 3,506,070 A | 4/1970 | Jones | |
| 3,613,786 A | 10/1971 | Jones et al. | |
| 3,623,553 A | 11/1971 | Burdge | |
| 3,740,343 A | 6/1973 | Jones | |
| 3,885,628 A | 5/1975 | Reed et al. | |
| 3,981,361 A | 9/1976 | Healy | |
| 4,240,504 A | 12/1980 | Reed | |
| 4,328,106 A | 5/1982 | Harrar et al. | |
| 4,348,462 A | 9/1982 | Chung | |
| 4,390,068 A | 6/1983 | Patton et al. | |
| 4,892,146 A | 1/1990 | Shen | |
| 5,168,082 A | 12/1992 | Matchett | |
| 5,381,863 A | 1/1995 | Wehner | |
| 6,863,985 B2 * | 3/2005 | Stark ..................... | C08F 220/12 428/447 |
| 7,033,975 B2 | 4/2006 | Baran et al. | |
| 7,101,616 B2 | 9/2006 | Arney et al. | |
| 7,216,712 B2 | 5/2007 | Dalton | |
| 7,380,606 B2 | 6/2008 | Pursley et al. | |
| 7,482,310 B1 | 1/2009 | Reese et al. | |
| 7,544,726 B2 | 6/2009 | Greenwood | |
| 7,553,888 B2 | 6/2009 | Greenwood et al. | |
| 8,101,812 B2 | 1/2012 | Fan et al. | |
| 8,272,442 B2 | 9/2012 | Fan et al. | |
| 8,404,107 B2 | 3/2013 | Fan et al. | |
| 8,522,876 B2 | 9/2013 | Fan et al. | |
| 8,685,234 B2 | 4/2014 | Fan et al. | |
| 9,068,108 B2 | 6/2015 | Hill et al. | |
| 9,181,468 B2 | 11/2015 | Fan et al. | |
| 9,321,955 B2 | 4/2016 | Hill et al. | |

(Continued)

FOREIGN PATENT DOCUMENTS

| | | |
|---|---|---|
| CN | 101735787 A | 6/2010 |
| CN | 102838981 A | 12/2012 |

(Continued)

OTHER PUBLICATIONS

An Office Action dated Jun. 5, 2018, in a corresponding U.S. Appl. No. 15/946,338 (16 pages).
An International Search Report dated Aug. 1, 2018, in a corresponding International Patent Application No. PCT/US2018/026227 (15 pages).
Estephan et al., "Zwitterion-Stabilized Silica Nanoparticles: Toward Nonstick Nano", Langmuir, vol. 26, No. 22, Nov. 16, 2010; 16884-16889 (6 pages).

(Continued)

*Primary Examiner* — Kumar R Bhushan
(74) *Attorney, Agent, or Firm* — Nixon & Vanderhye P.C.

(57) ABSTRACT

A brine resistant silica sol is described and claimed. This brine resistant silica sol comprises an aqueous colloidal silica mixture that has been surface functionalized with at least one moiety selected from the group consisting of a monomeric hydrophilic organosilane, a mixture of monomeric hydrophilic organosilane(s) and monomeric hydrophobic organosilane(s), or a polysiloxane oligomer, wherein the surface functionalized brine resistant aqueous colloidal silica sol passes at least two of three of these brine resistant tests: API Brine Visual, 24 Hour Seawater Visual and API Turbidity Meter.

15 Claims, No Drawings

(56) References Cited

U.S. PATENT DOCUMENTS

| | | | |
|---|---|---|---|
| 9,428,683 | B2 | 8/2016 | Hill et al. |
| 9,464,223 | B2 | 10/2016 | Champagne et al. |
| 9,505,970 | B2 | 11/2016 | Vaughn et al. |
| 9,512,352 | B2 | 12/2016 | Roddy et al. |
| 9,522,876 | B2 | 12/2016 | Winters et al. |
| 9,685,234 | B2 | 6/2017 | Balluchi et al. |
| 9,708,525 | B2 | 7/2017 | Suresh et al. |
| 9,725,999 | B2 | 8/2017 | Castrogiovanni et al. |
| 9,790,414 | B2 | 10/2017 | Champagne et al. |
| 9,850,418 | B2 | 12/2017 | Champagne et al. |
| 9,868,893 | B2 | 1/2018 | Saboowala et al. |
| 9,884,988 | B2 | 2/2018 | Dismuke et al. |
| 10,113,406 | B1 | 10/2018 | Gomaa et al. |
| 10,160,682 | B2 | 12/2018 | Mehta et al. |
| 10,377,942 | B2 | 8/2019 | Southwell et al. |
| 2003/0220204 | A1 | 11/2003 | Baran et al. |
| 2004/0077768 | A1 | 4/2004 | Greenwood |
| 2004/0097600 | A1 | 5/2004 | Greenwood et al. |
| 2006/0260815 | A1 | 11/2006 | Dahanayake |
| 2007/0238088 | A1 | 10/2007 | Rubinsztajn et al. |
| 2008/0289828 | A1 | 11/2008 | Hutchins |
| 2010/0096139 | A1 | 4/2010 | Holcomb et al. |
| 2010/0147515 | A1 | 6/2010 | Hughes et al. |
| 2011/0220360 | A1 | 9/2011 | Lindvig et al. |
| 2012/0024530 | A1 | 2/2012 | Todd et al. |
| 2012/0168165 | A1 | 7/2012 | Holcomb et al. |
| 2012/0175120 | A1 | 7/2012 | Holcomb et al. |
| 2013/0341020 | A1 | 12/2013 | Nguyen et al. |
| 2014/0116695 | A1 | 5/2014 | Maghrabi et al. |
| 2014/0162911 | A1* | 6/2014 | Monastiriotis ......... C09K 8/805 507/221 |
| 2014/0284053 | A1 | 9/2014 | Germack |
| 2014/0332218 | A1 | 11/2014 | Castrogiovanni et al. |
| 2014/0338906 | A1 | 11/2014 | Monastiriotis et al. |
| 2014/0338911 | A1 | 12/2014 | Hill et al. |
| 2014/0374095 | A1 | 12/2014 | Ladva et al. |
| 2015/0068744 | A1 | 3/2015 | Welton |
| 2015/0068755 | A1 | 3/2015 | Hill et al. |
| 2015/0218435 | A1 | 8/2015 | Suresh et al. |
| 2015/0268370 | A1 | 9/2015 | Johnston et al. |
| 2015/0292308 | A1 | 10/2015 | Conway |
| 2016/0017204 | A1 | 1/2016 | Hill et al. |
| 2016/0137907 | A1 | 5/2016 | Vo et al. |
| 2016/0194550 | A1 | 7/2016 | Hill et al. |
| 2016/0362594 | A1 | 12/2016 | Rojas |
| 2016/0369158 | A1 | 12/2016 | Patino |
| 2017/0306219 | A1* | 10/2017 | Quintero ................ C09K 8/528 |
| 2018/0291255 | A1 | 10/2018 | Southwell |
| 2018/0291261 | A1 | 10/2018 | Southwell et al. |
| 2019/0078015 | A1 | 3/2019 | Southwell et al. |
| 2019/0078016 | A1 | 3/2019 | Southwell et al. |
| 2019/0093462 | A1 | 3/2019 | Watts et al. |
| 2019/0136123 | A1 | 5/2019 | Holcomb et al. |

FOREIGN PATENT DOCUMENTS

| | | |
|---|---|---|
| CN | 106085401 A | 11/2016 |
| EP | 2465911 | 6/2002 |
| EP | 1509676 | 3/2005 |
| EP | 1818693 | 8/2007 |
| JP | H01-035157 | 7/1989 |
| JP | H01234468 A | 9/1989 |
| JP | H03 31380 | 2/1991 |
| JP | H05-086989 | 12/1993 |
| JP | H10111544 A | 4/1998 |
| JP | 2004-150859 | 5/2004 |
| JP | 4033970 B2 | 1/2008 |
| JP | 5026264 B2 | 9/2012 |
| KR | 101872020 B1 | 6/2018 |
| WO | WO 1995/011280 | 4/1995 |
| WO | WO 2003/100214 | 12/2003 |
| WO | WO 2005018300 A2 | 3/2005 |
| WO | 2009044912 A1 | 4/2009 |
| WO | WO 2010/103020 | 9/2010 |
| WO | 2013192634 A2 | 12/2013 |
| WO | WO 2014/153102 A1 | 9/2014 |
| WO | 2014176188 A1 | 10/2014 |
| WO | WO 2014/201367 A1 | 12/2014 |
| WO | WO 2016/040742 | 3/2016 |
| WO | WO 2016/205289 | 12/2016 |
| WO | 2017011328 A1 | 1/2017 |
| WO | WO 2017/023665 | 2/2017 |
| WO | 2017062086 A1 | 4/2017 |
| WO | 2018157099 A1 | 8/2018 |
| WO | 2018187550 A1 | 10/2018 |
| WO | 2018187563 A1 | 10/2018 |
| WO | 2019054414 A1 | 3/2019 |
| WO | WO 2019054414 A1 | 3/2019 |

OTHER PUBLICATIONS

Bjorkegren, et al., "Hydrophilic and hydrophobic modifications of colloidal silica particles for Pickering emulsions", Journal of Colloid and Interface Science, Academic Press, Inc, US, vol. 487, Oct. 15, 2016; 250-257.

Bjorkegren, "Functionalization and characterization of aqueous silica sols and their application in Pickering emulsions", Jan. 1, 2016, XP055492689, Retrieved from the Internet, www://publications.lib.chalmers.se/records/fulltext/246587/246587.pdf. pp. 1-34 and 7 page index (41 pages).

Bjorkegren, et a., "Surface activity and flocculation behavior of polyethylene glycol-functionalized silica nanoparticles", Journal of Colloid and Interface Science, Academic Press,Inc. US, vol. 452, Apr. 27, 2015, 215-223 (9 pages).

De Lara et al., "Functionalized Silica Nanoparticles within Multicomponent Oil/Brine Interfaces: A Study in Molecular Dynamics", Journal of Physical Chemistry C, vol. 120, No. 12, Mar. 22, 2016, 6787-6795 (9 pages).

An International Search Report dated Aug. 1, 2018, in a corresponding International Patent Application No. PCT/US2018/026245 (14 pages).

Brunel, "Functionalized micelle-templated silicas (MTS) and their use as catalysts for fine chemicals", Microporous and Mesoporous Materials, vol. 27, No. 2-3, Feb. 1, 1999, 329-344 (16 pages).

A Non-Final Office Action dated Sep. 10, 2018, in a corresponding U.S. Appl. No. 15/946,252 (10 pages).

Farooqui et al., "Improvement of the Recovery Factor Using Nano-Metal Particles at the Late Stages of Cyclic Steam Stimulation", Society of Petroleum Engineers, XP-002776733, SPE-174478-MS, Jun. 11, 2015.

Ju et al., "Enhanced Oil Recovery by Flooding with Hydrophilic NanoParticles", China Particuology vol. 4, No. 1, 41-46, 2006.

Goodwin et al., "Functionalization of Colloidal Silica and Silica Surfaces via Silylation Reactions", Colloid Polym Sci 268:766-777 (1990).

Zhang, et al., "Foams and Emulsions Stabilized with Nanoparticies for Potential Conformance Control Applications", SPE International Symposium on Oilfield Chemistry held in the Woodlands, Texas, USA, Apr. 20-22, 2009.

McElfresh et al., "Application of Nanofluid Technology to Improve Recovery in Oil and Gas Wells", SPE International Oilfield Nanotechnology Conference held in Noordwijk, The Netherlands, Jun. 12-14, 2012.

Hoelscher et al., "Application of NanoTechnology in Drilling Fluids", SPE International Oilfield Nanotechnology Conference held in Noordwijk, The Netherlands, Jun. 12-14, 2012.

Hendraningrat et al., "A Corefield Investigation of Nanofluid Enhanced Oil Recovery in Low-Medium Permeability Berea Sandstone", SPE International Symposium on Oilfield Chemistry held in the Woodlands, Texas, USA, Apr. 8-10, 2013.

Arkles, "Hydrophobicity, Hydrophilicity and Silanes", Paint & Coatings Industry Magazine, Oct. 2006.

European Search Report dated Jul. 31, 2017 in European Patent Application No. 17166435.2 (8 pages).

European Search Report dated Jul. 31, 2017 in European Patent Application No. 17166443.6 (7 pages).

European Search Report dated Jul. 31, 2017 in European Patent Application No. 17166426.1 (7 pages).

(56) References Cited

OTHER PUBLICATIONS

A Search Report dated Oct. 12, 2018 in Great Britain Application No. GB1811749.9 (3 pages).
Alomair, O,A., et al., "Nanofluids Application for Heavy Oil Recovery" SPE International, SPE-171S39-MS, Society of Petroleum Engineers (Oct. 2014).
Amendment and Response to Office Action with Declaration Under 37 C.F.R. §1.132 filed Jan. 11, 2019 in U.S. Appl. No. 15/946,338.
Aminzadeh, B., et al., "Influence of Surface-Treated Nanoparticles on Displacement Patterns During CO Injection," SPE Annual Technical Conference and Exhibition, 20 pages (Jan. 2013).
Carpenter, "Modeling of Production Decline Caused by Fines Migration in Deepwater Reservoirs" Journal of Petroleum Technology, 75-77 (Feb. 2018).
Denney, "Nanosized Particles for Enhanced Oil Recovery" Journal of Petroleum Technology, 54-46 (Jan. 2011).
EPA, "Method 180.1: Determination of Turbidity by Nephelometry," (Aug. 1993).
Extended European Search Report dated Jan. 8, 2018, in EP Application No. 17194608.0 (6 pages).
International Search Report and Written Opinion for International Application No. PCT/JP2017/037208, European Patent Office, The Hague, dated Jun. 5, 2018, 8 pages.
International Search Report and Written Opinion for International Application No. PCT/US2018/052736, European Patent Office, The Hague, dated Dec. 12, 2018, 9 pages.
International Search Report and Written Opinion for International Application No. PCT/US2018/058954, European Patent Office, The Hague, dated Feb. 13, 2019, 12 pages.
Jurinak, J.J., et al., "Oilfield Application of Colloidal Silica Gel," SPE Production Engineering, 6 (4):406-412 (Nov. 1991). XP055551121.
Li, L., et al., "Gas Selection for Huff-n-Puff EOR in Shale Oil Reservoirs Based upon Experimental and Numerical Study," Society of Petroleum Engineers, SPE-185066-MS, 15 pages (2017).
Li, L., et al., "Optimization of Huff-n-Puff Gas Injection to Enhance Oil Recovery in Shale Reservoirs," Society of Petroleum Engineers, SPE-180219-MS, 18 pages (2016).
Miller, B.J., et al., "Field Case: Cyclic Gas Recovery for Light Oil-Using Carbon Dioxide/Nitrogen/Natural Gas," Society of Petroleum Engineers, SPE 49169, 7 pages (1998).
Wilson, A., "Field Trials of Reservoir Nanoparticals Reveal Stability, High Rates of Recovery," Journal of Petroleum Technology, 64, (11):92-99 (Nov. 2012).
Palmer, F.S., et al., "Design and Implementation of Immiscible Carbon Dioxide Displacement Projects (CO2 Huff-Puff) in South Louisiana," Society of Petroleum Engineers, SPE 15497, 10 pages (1986).
Shafiq, M.U., et al., "Sandstone Matrix Acidizing Knowledge and Future Development," Journal of Petroleum Exploration and Production Technology, 7 (4):1205-1216 (Dec. 2017).
Skauge,T., et al.,"Nano-sized Particles for EOR" SPE International, SPE 129933, Society of Petroleum Engineers (Apr. 2010).
Syfan, F.E., et al., "Enhancing Delaware Basin Stimulation Results Using Nanoparticle Dispersion Technology," Society of Petroleum Engineers, SPE-189876-MS, 24 pages (2018).
Wang et al., "Waterless fracturing technologies for unconventional reservoirs—opportunities for liquid nitrogen" Journal of Natural Gas Science and Engineering, 35:160-174 (2016).
Wasan, D., et al., "Spreading of Nanofluids on Solids," Nature, 423:156-159 (May 2003).
Wei et al., "Mechanisms of N2 and CO2 Assisted Steam Huff-n-Puff Process in Enhancing Heavy Oil Recovery: A Case Study Using Experimental and Numerical Simulation," Society of Petroleum Engineers, SPE-183871-MS, 12 pages (2017).
Partial English translation of title page and claims of Chinese Publication No. 101735787 A, published Jun. 16, 2010.
Partial English translation of title page and claims of Chinese Publication No. 102838981 A, published Dec. 26, 2012.
Partial English translation of title page and claims of Chinese Publication No. 106085401 A, published Nov. 6, 2016.
English translation of the Written Opinion for International Application No. PCT/JP2018/033831, Japan Patent Office, dated Nov. 13, 2018, 6 pages.
Written Opinion for International Application No. PCT/JP2018/033831, Japan Patent Office, dated Nov. 13, 2018, 5 pages.
English machine translation of Korean Patent Publication No. 101872020 B1, published Jun. 27, 2018.
Non-Final Office Action dated Sep. 10, 2018, in U.S. Appl. No. 15/946,252 (10 pages).
Non-Final Office Action dated Jun. 5, 2018, in U.S. Appl. No. 15/946,338, (16 pages).
Sears, "Determination of Specific Surface Area of Colloidal Silica by Titration with Sodium Hydroxide", Analytical Chemistry, 28:12, pp. 1981-1983 (Dec. 1956).
English machine translation of Japanese Patent Publication No. H01-035157, published Jul. 24, 1989.
English machine translation of Japanese Patent Publication No. JP H05-086989, published Dec. 15, 1993.
Final Office Action dated Jan. 4, 2019, in U.S. Appl. No. 15/946,252.
Non-Final Office Action dated Jan. 31, 2019, in U.S. Appl. No. 16/179,676.
Non-Final Office Action dated Feb. 27, 2019, in U.S. Appl. No. 16/129,688.
Non-Final Office Action dated Feb. 28, 2019, in U.S. Appl. No. 16/129,705.
Final Office Action dated Mar. 20, 2019, in U.S. Appl. No. 16/141,824.
Office Action dated Jul. 12, 2019 in corresponding U.S. Appl. No. 15/946,252, filed Apr. 5, 2018.
Final Office Action dated Jun. 18, 2019 in corresponding U.S. Appl. No. 16/129,688, filed Sep. 12, 2018.
Final Office Action dated Jun. 18, 2019 in corresponding U.S. Appl. No. 16/129,705, filed Sep. 12, 2018.
Notice of Allowance dated Jun. 24, 2019 in corresponding U.S. Appl. No. 15/946,338, filed Apr. 5, 2018.
Technical Data Sheet of Aerosil R972 downloaded on Jun. 12, 2019.
Final Office Action dated Aug. 19, 2019, in U.S. Appl. No. 16/179,676.
Non-Final Office Action dated Nov. 5, 2019, in U.S. Appl. No. 16/141,824.
U.S. Appl. No. 16/453,087, filed Jun. 26, 2019, Southwell, J.E. et al.

* cited by examiner

BRINE RESISTANT SILICA SOL

CROSS-REFERENCE TO RELATED PATENT APPLICATIONS

This patent application is a continuation of U.S. patent application Ser. No. 15/946,252, filed 5 Apr. 2018, "Brine Resistant Silica Sol", which claims priority to U.S. Provisional Patent Application No. 62/482,429, filed 6 Apr. 2017, "Brine Resistant Silica Sol"; U.S. Provisional Patent Application No. 62/482,470, filed 6 Apr. 2017, "Hydrocarbon Treatment Fluid"; and U.S. Provisional Patent Application No. 62/482,461, filed 6 Apr. 2017, "Surface Functionalized Colloidal Silica with Enhanced Stability", the entire contents of each of which are hereby incorporated herein by reference.

FIELD OF THE INVENTION

The present invention relates to a surface treated colloidal silica sol having excellent stability in brine.

BACKGROUND OF THE INVENTION

Colloidal silica has many known industrial uses including frictionizing agents for textiles, improvement of polymeric materials including lowering Coefficient of Thermal Expansion, raising of Young's Modulus and Tensile strength, lowering % Elongation, raising electrical insulating properties and resistance to electrical breakdown voltage, production of more efficient catalyst materials, and many other useful functions. Colloidal silica can be used in its original aqueous form or be converted to nonaqueous colloidal dispersions for use in applications that do not tolerate the presence of water.

It is known to be advantageous to attach organic surface character to the surface of colloidal silica particles of aqueous solution. One such application is latex and emulsion polymerization chemistry, where the addition of surface-treated colloidal silica can improve and modify the physical properties of the dried or cured latex coating. The addition of organic surface character to latex coatings can impart stability and shelf life to the colloidal silica component of a latex coating formulation.

U.S. Pat. No. 7,544,726 "Colloidal Silica Compositions", issued 9 Jun. 2009, describes and claims a method of producing a stable aqueous silanized colloidal silica dispersion without the presence of any water-miscible organic solvents or optionally comprising one or more water-miscible organic solvents, if present, in a total amount of up to about 5% by volume of the total volume, said dispersion having a silica content of at least 20 wt %, said method comprising mixing at least one silane compound and colloidal silica particles in an aqueous silica sol having an S-value from 30 to 90 in a weight ratio of silane to silica from 0.003 to 0.2. It also describes and claims a stable aqueous silanized colloidal silica dispersion without the presence of any water-miscible organic solvents or optionally comprising one or more water-miscible organic solvents, if present, in a total amount of up to about 5% by volume of the total volume, said dispersion having a silica content of at least 20 wt % obtained by mixing colloidal silica particles and at least one silane compound in an aqueous silica sol having an S-value from 30 to 90 in a weight ratio of silane to silica from 0.003 to 0.2. It also describes and claims a stable aqueous silanized colloidal silica dispersion without the presence of any water-miscible organic solvents or optionally comprising one or more water-miscible organic solvents, if present, in a total amount of up to about 5% by volume of the total volume, said dispersion having a silica content of at least 20 wt % and having a weight ratio of silane to silica from 0.003 to 0.2, wherein colloidal silica particles are dispersed in a silica sol having an S-value from 30 to 90.

U.S. Pat. No. 7,553,888 "Aqueous Dispersion", issued 30 Jun. 2009, describes and claims a method of producing an aqueous dispersion comprising mixing at least one silane compound and colloidal silica particles to form silanized colloidal silica particles and mixing said silanized colloidal silica particles with an organic binder to form the dispersion. The invention also relates to a dispersion obtainable by the method, and the use thereof.

U.S. Pat. No. 5,013,585A, "Method for the Preparation of Surface-Modified Silica Particles" (issued 7 May 1991 and expired 6 Jun. 2010), describes and claims a method for the preparation of a stable silica organosol in a monomeric hydrophobic organic solvent. The method comprises (a) hydrolyzing a tetraalkoxy silane, e.g. tetraethoxy silane, in an alcoholic medium in the presence of a limited amount of water and ammonia as a catalyst under controlled conditions so as to produce a silica alcosol in which the silica particles satisfy the requirements that the alkoxy groups and silanolic hydroxy groups are bonded to the silicon atoms on the surface in densities of at least 3.5 µmoles/m$^2$ and not exceeding 2 µmmoles/m$^2$, respectively, and the specific surface area S given in m$^2$/g and the average particle diameter D given in nm of the silica particles satisfy the relationship of S×D≥5000, D being 1 nm or larger, and (b) admixing the alcosol of silica particles with an organosilicon compound selected from the group consisting of the compounds represented by the general formula $R_{4-n}SiX_n$, $(R_3Si)_2NH$, or YO—(—SiR$_2$—O—)$_m$—Y, in which each R is, independently from the others, a hydrogen atom or a monovalent hydrocarbon group, X is a hydroxy group or an alkoxy group, Y is a hydrogen atom or an alkyl group, n is 1, 2 or 3 and m is a positive integer not exceeding 20, in an amount, for example, in the range from 0.01 to 10 moles per mole of the silica particles under agitation of the mixture to effect a reaction for the modification of the surface of the silica particles followed by replacement of the alcoholic medium with a desired organic solvent.

The article "Functionalization of Colloidal Silica and Silica Surfaces via Silylation Reactions" by J. W. Goodwin, R. S. Harbron and P. A. Reynolds was published in *Colloid and Polymer Science*. August 1990, Volume 268, Issue 8. pp 766-777. The word described in this article relates to a series of trialkoxysilane compounds tipped with primary amine groups being used to functionalize the surfaces of glass and colloidal silica. Streaming potential and microelectrophoretic mobility measurements were used to monitor the stability of the functionalized surfaces. Hydrolytic breakdown of the surface-to-silane coupling was induced by either successively increasing and decreasing the pH of the solution in contact with the surface, or by aging the derivatised surfaces in aqueous solution over prolonged periods of time. The chemistry of the spacer units between the trialkoxysilane group and the primary amine tip had a major influence on the subsequent hydrolytic stability. Large monomeric hydrophobic spacer groups showed small changes in the electrokinetic properties on storage, but large changes when successively titrated with acid and base through the pH range. The behavior observed with small monomeric hydrophobic spacer groups was that large changes in electrokinetic properties were obtained on storage and with pH titration.

The article "Use of (Glycidoxypropyl)trimethoxysilane as a Binder in Colloidal Silica Coatings", by L. Chu, M. W. Daniels, and L. F. Francis, was published in *Chem. Mater.*, 1997, 9 (11), pp 2577-2582. In this work, colloidal silica coatings were produced from suspensions of silica modified with (glycidoxypropyl)trimethoxysilane (GPS). Coating dispersions were prepared by adding GPS to a silica colloid (12 nm) suspension. Adsorption of hydrolyzed GPS species on silica surfaces was monitored by attenuated total reflection Fourier transform infrared spectroscopy. The addition of GPS to a basic silica suspension (pH 9.5) favored condensation among hydrolyzed GPS species over adsorption. By contrast, more adsorption on the silica colloids occurred in acidic suspensions (pH 4) and condensation among hydrolyzed GPS species was slower. The interaction between GPS and colloidal silica was also reflected in the aggregation and gelation behavior of the suspensions and the coating microstructure. Suspensions prepared by addition of GPS at low pH resulted in coatings that were less prone to cracking. In addition, polyamine could be added to these suspensions to cure the coatings. Compared with unmodified silica coatings, coatings prepared with GPS modification were denser, adhered better to the polymer substrate, and could be made thicker (up to 20 μm). Coatings were also transparent to the eye.

Colloidal silica can be used in treatment fluids for enhanced oil recovery, specifically in downhole injection treatments to hydrocarbon-bearing subterranean formations for improving oil recovery in downhole applications such as fracturing, stimulation, completion, and remediation.

Commercially available colloidal silica mixtures suitable for these treatment fluids include the nanoActiv™ HRT product line available from Nissan Chemical America, http://www.nanoactiv.com/. These products use nanosized particles in a colloidal dispersion, which allows the fluid to work by causing a Brownian-motion, diffusion-driven mechanism known as disjoining pressure to produce long efficacy in the recovery of hydrocarbons in conventional and unconventional reservoirs.

US published patent application US2012/0168165A1 (abandoned 17 Dec. 2012), "METHOD FOR INTERVENTION OPERATIONS IN SUBSURFACE HYDROCARBON FORMATIONS" describes and claims colloidal silica added to a fluid containing a wetting agent to enhance wetting of solid surfaces in and around the well and removing a water-block from the well. The wetting agent and colloidal silica combine to produce a wetting of the surfaces of the rock that allows recovery of the excess water near the well (water block).

US published patent application US2012/0175120 (abandoned 29 Nov. 2012), "METHOD FOR INTERVENTION OPERATIONS IN SUBSURFACE HYDROCARBON FORMATIONS", describes and claims colloidal silica added to a fluid containing a wetting agent and the fluid is pumped down a well to enhance wetting of solid surfaces in and around the well before pumping an acid solution down the well. After acid is pumped, a fluid containing colloidal silica and wetting agent is again pumped down the well, leading to improved flow capacity of the well.

US published patent application US2010/096139A1 (abandoned 9 Oct. 2012) "METHOD FOR INTERVENTION OPERATIONS IN SUBSURFACE HYDROCARBON FORMATIONS", describes and claim methods for improved intervention processes in a well. Colloidal silica is added to a fluid containing a wetting agent to enhance wetting of solid surfaces in and around the well, leading to improved flow capacity of the well.

US published patent application US 2016/0017204, "METHODS AND COMPOSITIONS COMPRISING PARTICLES FOR USE IN OIL AND/OR GAS WELLS", now pending, describes a method for treating an oil and/or gas well comprising combining a first fluid and a second fluid to form an emulsion or microemulsion, wherein the first fluid comprises a plurality of monomeric hydrophobic nanoparticles and a non-aqueous phase, wherein the second fluid comprises a surfactant and an aqueous phase, and wherein in the microemulsion, a portion of the nanoparticles are each at least partially surrounded by surfactant and in contact with at least a portion of the non-aqueous phase; and injecting the emulsion or microemulsion into an oil and/or gas well comprising a wellbore.

These patent applications discuss the use of a mixture of colloidal silica in combination with a wetting agent for modifying solid rock surfaces in an aqueous or hydrocarbon-based fluid for injection into an oil well to effect improved oil recovery. They do not discuss the brine resistance properties of the colloidal silica.

It is generally well known in oilfield applications that subterranean formations contain large amounts of water containing dissolved salts such as NaCl, $CaCl_2$, KCl, $MgCl_2$ and others. This aqueous salt mixture is typically referred to as Brine. Brine conditions for different regions and wells vary widely with different downhole conditions and lithologies. In general, fluids used downhole must either tolerate briny conditions or have brine-resistant properties.

While these patent applications explore the use of colloidal silica, including aqueous colloidal silica, in downhole oilfield applications and there are commercial products containing colloidal silica available; none of these patent applications or commercial products address the utility of brine resistant colloidal silica.

SUMMARY OF THE INVENTION

The first aspect of the instant claimed invention is a brine resistant aqueous silica sol comprising an aqueous colloidal silica mixture that has been surface functionalized with at least one moiety selected from the group consisting of a monomeric hydrophilic organosilane, a mixture of monomeric hydrophilic and monomeric hydrophobic organosilanes, or a polysiloxane oligomer, wherein the brine resistant aqueous colloidal silica sol passes at least two of three of these brine resistant tests: API Brine Visual, 24 Hour Seawater Visual and API Turbidity Meter.

The second aspect of the instant claimed invention is the brine resistant aqueous silica sol of the first aspect of the instant claimed invention, wherein the brine resistant silica sol passes all three of these brine resistant tests: API Brine Visual, 24 Hour Seawater Visual and API Brine by Turbidity Meter.

The third aspect of the instant claimed invention is the brine resistant aqueous silica sol of the first aspect of the instant claimed invention wherein the surface functionalization is done by contacting the silica sol with monomeric hydrophilic organosilane that comprises less than 5 wt. % polyethylene oxide moieties.

The fourth aspect of the instant claimed invention is the brine resistant aqueous silica sol of the third aspect of the invention wherein the surface functionalization is done by contacting the silica sol with a monomeric hydrophilic organosilane comprising a heterocyclic ring; wherein said heterocyclic ring optionally comprises an oxygen moiety.

The fifth aspect of the instant claimed invention is the brine resistant aqueous silica sol of the third aspect of the invention wherein the surface functionalization is done by contacting the silica sol with a monomeric hydrophilic organosilane comprising a glycidoxy, epoxy, or oxetane ring.

The sixth aspect of the instant claimed invention is the brine resistant aqueous silica sol of the first aspect of the invention wherein the surface functionalization is done by contacting the silica sol with a mixture of monomeric hydrophilic organosilanes and monomeric hydrophobic organosilanes.

The seventh aspect of the instant claimed invention is the brine resistant aqueous silica sol of the first aspect of the invention wherein the surface functionalization is done by contacting the silica sol with a polysiloxane oligomer.

The eighth aspect of the instant claimed invention is the brine resistant aqueous silica sol of the seventh aspect of the invention, wherein the polysiloxane oligomer comprises (i) at least one monomeric hydrophobic organosilane monomer unit; and (ii) at least one monomeric hydrophilic organosilane monomer unit.

The ninth aspect of the instant claimed invention is the brine resistant silica sol of the seventh aspect of the invention:
(a) wherein the polysiloxane oligomer comprises Ingredient A and Ingredient B,
(b) wherein Ingredient A is glycidoxypropyltrimethoxysilane and Ingredient B is selected from the group consisting of one or more of methacryloxypropyltrimethoxysilane, isobutyltrimethoxysilane, vinyltrimethoxysilane, trimethoxy[2-(7-oxabicyclo[4.1.0]hept-3-yl)ethyltrimethoxysilane and hexamethyldisiloxane; and
(c) wherein the colloidal silica mixture comprises silica and water.

The tenth aspect of the instant claimed invention is the brine resistant silica sol of the first aspect of the instant claimed invention wherein the hydrophilic organosilane monomer unit exhibits a critical surface tension in the range of from about 40 mN/m to about 50 mN/m. and the hydrophobic organosilane monomer unit exhibits a critical surface tension in the range of from about 15 mN/m to about 39.5 mN/m

DETAILED DESCRIPTION OF THE INVENTION

The first aspect of the instant claimed invention is a brine resistant aqueous silica sol comprising an aqueous colloidal silica mixture that has been surface functionalized with at least one moiety selected from the group consisting of a monomeric hydrophilic organosilane, a mixture of monomeric hydrophilic and monomeric hydrophobic organosilanes, or a polysiloxane oligomer, wherein the brine resistant aqueous colloidal silica sol passes at least two of three of these brine resistant tests: API Brine Visual, 24 Hour Seawater Visual and API Turbidity Meter.

This invention is the creation of a brine resistant silica sol by surface functionalizing the silica using at least one moiety selected from the group consisting of a monomeric hydrophilic organosilane, a mixture of monomeric hydrophilic and monomeric hydrophobic organosilanes, or a polysiloxane oligomer, wherein the brine resistant aqueous colloidal silica sol passes at least two of three of these brine resistant tests: API Brine Visual, 24 Hour Seawater Visual and API Turbidity Meter. One potential utility for this brine resistant silica sol is to use it to treat an underperforming oil well with this brine resistant silica sol to improve the crude oil removal performance.

Colloidal systems in general, and aqueous colloidal silica systems in particular, rely primarily upon electrostatic repulsion between charged silica particles to avoid unwanted or adverse phenomena such as particle agglomeration, flocculation, gelation and sedimentation. This electrostatic repulsion is easily disrupted in briny conditions typically found in subterranean formations. Furthermore, agglomeration/flocculation/gelation/sedimentation of colloidal silica and fluids containing colloidal silica in downhole applications would have the potential to damage the well or potentially plug the well entirely. Therefore, application of colloidal silica in downhole applications necessitates imparting brine resistant properties to colloidal silica and fluids containing colloidal silica before application. Standard tests for brine stability are disclosed herein.

It has been discovered that brine resistance of aqueous colloidal silica can be improved over untreated colloidal silica by addition of certain types of organic surface treatment. It was discovered that colloidal silica brine resistance could be further improved by surface treatment using at least one moiety selected from the group consisting of a monomeric hydrophilic organosilane, a mixture of monomeric hydrophilic organosilanes and monomeric hydrophobic organosilanes, or a polysiloxane oligomer. It was furthermore discovered that use of these brine resistant colloidal systems in formulated fluids could improve performance in tests designed to model hydrocarbon recovery from subterranean formations.

There are known ways to modify the surface of colloidal silica:
1. Covalent attachment of inorganic oxides other than silica.
2. Non-covalent attachment of small molecule, oligomeric, or polymeric organic materials (PEG treatment, amines or polyamines, sulfides, etc.).
3. Covalent attachment of organic molecule including oligomeric and polymeric species:
   a. Reaction with organosilanes/titanates/zirconates/germanates.
   b. Formation of organosilanes/titanate/zirconate/germanate oligomers followed by reaction of these with surface of colloidal silica.
   c. Silanization followed by post-reaction formation of oligomeric/dendritic/hyperbranched/polymeric species starting from colloidal silica surface.
   d. Formation of oligomeric/dendritic/hyperbranched/polymeric silanes/zirconates/titanates followed by reaction to $SiO_2$ surface.

The silica particles included in the aqueous colloidal silica that is used in the brine resistant silica sol may have any suitable average diameter. As used herein, the average diameter of silica particles refers to the average largest cross-sectional dimension of the silica particle. In certain embodiments, the silica particles may have an average diameter of between about 0.1 nm and about 100 nm, between about 1 nm and about 100 nm, between about 5 nm and about 100 nm, between about 1 nm and about 50 nm, between about 5 nm and about 50 nm, between about 1 nm and about 40 nm, between about 5 nm and about 40 nm, between about 1 nm and about 30 nm, between about 5 nm and about 30 nm, or between about 7 nm and about 20 nm.

In some embodiments, the silica particles have an average diameter of less than or equal to about 30 nm, less than or equal to about 25 nm, less than or equal to about 20 nm, less than or equal to about 15 nm, less than or equal to about 10 nm, or less than or equal to about 7 nm. In certain embodiments, the silica particles have an average diameter of at least about 5 nm, at least about 7 nm, at least about 10 nm, at least about 15 nm, at least about 20 nm, or at least about 25 nm. Combinations of the above-referenced ranges are also possible.

Because of the nanometer diameters of the particles another word to describe the silica particles is by calling them nanoparticles.

In certain embodiments, the aqueous colloidal silica is commercially available silica. Commercially available colloidal silica including silica particles of the desired size that are suitable for use in the instant claimed invention are available from Nissan Chemicals America.

A common and economical way to add organic surface character to colloidal inorganic oxide particles is reaction of colloidal silica surfaces with at least one moiety selected from the group consisting of a monomeric hydrophilic organosilane, a mixture of monomeric hydrophilic and monomeric hydrophobic organosilanes, or a polysiloxane oligomer.

Suitable monomeric hydrophilic organosilanes include, but are not limited to, glycidoxypropyl trimethoxysilane, glycidoxypropyl triethoxysilane, glycidoxypropyl tributoxysilane, glycidoxypropyl trichlorosilane, phenyl trimethoxysilane, phenyl trimethoxysilane and phenyl trichlorosilane.

Suitable monomeric hydrophobic organosilanes include, but are not limited to, Trimethoxy[2-(7-oxabicyclo[4.1.0]hept-3-yl)ethyl]silane, Triethoxy[2-(7-oxabicyclo[4.1.0]hept-3-yl)ethyl]silane, Trichloro[2-(7-oxabicyclo[4.1.0]hept-3-yl)ethyl]silane, Methacryloxypropyl trimethoxysilane, Methacryloxypropyl triethoxysilane, Methacryloxypropyl trichlorosilane, Vinyltrimethoxysilane, Vinyltriethoxysilane, Vinyltrichlorosilane, Isobutyltrimethoxysilane, Isobutyltriethoxysilane, Isobutyltrichlorosilane, Hexamethyldisiloxane and Hexamethyldisilazane.

Organosilanes of many types and variations can be obtained easily and cheaply as other large volume applications exist for these materials within industrial chemistry. While this method is cheap and simple in application to colloidal silica chemistry, there exist some limitations with respect to surface modification.

Limitations include poor solubility of the starting organosilane in the dispersion solvent of colloidal silica which can result in incomplete surface functionalization or unwanted side reaction products. In other instances, successful surface reaction of colloidal silica with the wrong organosilane can result in loss of colloidal stability and agglomeration of the colloidal silica. In the situation or poor organosilane solubility, formation of organosilane oligomers before reaction with colloidal silica surfaces can be advantageous. Prehydrolysis and condensation of organosilanes to form polysiloxane oligomers is well known in the field of Sol-Gel science. This method is used to produce sol-gel type inorganic binders and primer coatings for sol-gel coating applications.

Polysiloxane Oligomers

In some instances, a superior surface functionalization can be achieved by initial oligomerization of organosilanes followed by reaction with colloidal silica. Prehydrolysis and condensation of organosilanes to produce oligomeric polysiloxane materials is a known method mainly in coating science. See EP 1818693A1, "Anti-Reflective Coatings" by Iler, Osterholtz, Plueddemann. This European Patent Application was filed with a claim to a coating composition comprising (i) surface-modified nano-particles of a metal oxide, (ii) metal oxide-based binder, wherein the weight ratio of metal oxide in (i) to (ii) is from 99:1 to 1:1.

In the case of aqueous colloidal silica, it has been observed that surface reaction with organosilanes can have limitations due to solubility of organosilanes. Reaction of aqueous colloidal silica with organosilanes having too much monomeric hydrophobic character can be unsuccessful for two main reasons:

1. The relatively monomeric hydrophobic organosilane is not soluble enough in the aqueous system to effectively dissolve and react with the surfaces of aqueous colloidal silica.
2. The relatively monomeric hydrophobic organosilanes are able to dissolve in the aqueous system but after reaction to the colloidal silica surface renders the colloidal silica too monomeric hydrophobic to be stable in the aqueous system.

One method to achieve improved reaction of monomeric hydrophobic organosilanes with aqueous colloidal silica is prehydrolysis. Prehydrolysis is described here: "Silane Coupling Agents", from Shin-Etsu Silicones, March 2015, available from http://www.shinetsusilicone-global.com/catalog/pdf/SilaneCouplingAgents_e.pdf.

The prehydrolysis method relies on hydrolysis reaction of organosilane molecules together to form short polysiloxane type oligomeric chains of organosilane monomeric species. These prehydrolyzed species can display improved aqueous solubility. In the case of relatively monomeric hydrophobic organosilanes, prehydrolysis may improve initial water solubility but may not improve the ultimate stability of the reaction product of prehydrolyzed monomeric hydrophobic organosilane oligomers with aqueous colloidal silica due to incompatibility of the final surface-functionalized silica due to too much monomeric hydrophobic character.

The reason to practice this method of prehydrolysis of mixtures of monomeric hydrophobic silanes with monomeric hydrophilic silanes is to effect rapid and convenient synthesis of brine-resistant aqueous colloidal systems having a combination of monomeric hydrophilic and monomeric hydrophobic character.

The method of prehydrolysis of monomeric hydrophobic silanes with monomeric hydrophilic silanes before reaction with the surface of colloidal silica may allow for introduction of organosilanes molecules to aqueous colloidal silica surfaces that would not otherwise be possible due to excessive monomeric hydrophobic character in an aqueous colloidal system. In this way surface treated colloidal silica can be made as monomeric hydrophobic as possible while remaining stable and dispersed in an aqueous system.

For example, in pure form vinyltrimethoxysilane is sparingly soluble in water or aqueous colloidal silica. One skilled in the art may use methods or cosolvents to achieve solubilization of vinyltrimethoxysilane by itself into aqueous colloidal silica, but this application to colloidal silica has some difficulties. Vinyltrimethoxysilane, when reacted to the colloidal silica surface, will impart to the silica surface the nonpolar organic character of vinyl groups, which impart sufficient monomeric hydrophobic character to the particles as to destabilize the aqueous colloidal silica and cause the silica to agglomerate and precipitate out of solution or form a gel.

It has been observed that addition of certain types of organic surface character improve stability of aqueous colloidal silica in salt/brine solutions.

The second aspect of the instant claimed invention is the brine resistant aqueous silica sol of the first aspect of the instant claimed invention, wherein the brine resistant silica sol passes all three of these brine resistant tests: API Brine Visual, 24 Hour Seawater Visual and API Brine by Turbidity Meter.

The third aspect of the instant claimed invention is the brine resistant aqueous silica sol of the first aspect of the instant claimed invention wherein the surface functionalization is done by contacting the silica sol with monomeric hydrophilic organosilane that comprises less than 5 wt. % polyethylene oxide moieties.

The fourth aspect of the instant claimed invention is the brine resistant aqueous silica sol of the third aspect of the invention wherein the surface functionalization is done by contacting the silica sol with a monomeric hydrophilic organosilane comprising a heterocyclic ring; wherein said heterocyclic ring optionally comprises an oxygen moiety.

The fifth aspect of the instant claimed invention is the brine resistant aqueous silica sol of the third aspect of the invention wherein the surface functionalization is done by contacting the silica sol with a monomeric hydrophilic organosilane comprising a glycidoxy, epoxy, or oxetane ring.

The sixth aspect of the instant claimed invention is the brine resistant aqueous silica sol of the first aspect of the invention wherein the surface functionalization is done by contacting the silica sol with a mixture of monomeric hydrophilic and monomeric hydrophobic organosilanes.

The seventh aspect of the instant claimed invention is the brine resistant aqueous silica sol of the first aspect of the invention wherein the surface functionalization is done by contacting the silica sol with a polysiloxane oligomer.

The eighth aspect of the instant claimed invention is the brine resistant aqueous silica sol of the seventh aspect of the invention, wherein the polysiloxane oligomer comprises (i) at least one monomeric hydrophobic organosilane monomer unit; and (ii) at least one monomeric hydrophilic organosilane monomer unit.

The ninth aspect of the instant claimed invention is the brine resistant silica sol of the seventh aspect of the invention:
(a) wherein the polysiloxane oligomer comprises Ingredient A and Ingredient B,
(b) wherein Ingredient A is glycidoxypropyltrimethoxysilane and Ingredient B is selected from the group consisting of one or more of methacryloxypropyltrimethoxysilane, isobutyltrimethoxysilane, vinyltrimethoxysilane, trimethoxy[2-(7-oxabicyclo[4.1.0]hept-3-yl)ethyltrimethoxysilane and hexamethyldisiloxane; and
(c) wherein the colloidal silica mixture comprises silica and water.

Improvement of brine stability in colloidal silica systems can be found by using the strategy of monomeric hydrophobic/monomeric hydrophilic organosilane combination and adding this combination to the surface of colloidal silica.

One measure of monomeric hydrophobicity/monomeric hydrophilicity for organosilanes materials is surface tension or critical surface tension. Surface tension values for commercial organosilanes materials may be found in supplier literature materials (Gelest). Higher surface tension values indicate a more monomeric hydrophilic material, conversely lower surface tension values indicate a more monomeric hydrophobic material.

As stated in the Arkles' article, "Hydrophobicity, Hydrophilicity and Silanes, Paint & Coatings Industry Magazine, October 2006 on page 3, "Critical surface tension is associated with the wettability or release properties of a solid. . . . Liquids with a surface tension below the critical surface tension ($\gamma c$) of a substrate will wet the surface, . . . continued on page 4 . . . . Hydrophilic behavior is generally observed by surfaces with critical surface tensions greater than 35 dynes/cm (35 mN/m) . . . . Hydrophobic behavior is generally observed by surfaces with critical surface tensions less than 35 dynes/cm (35 mN/m)."

Surface tension values for commercial organosilanes materials may be found in supplier literature materials (such as Gelest, http://www.gelest.com/). Higher surface tension values indicate a more hydrophilic material, conversely lower surface tension values indicate a more hydrophobic material.

| | Critical Surface Tension (mN/m) |
|---|---|
| Glycidoxypropyl Trimethoxysilane | 42.5 |
| Mercaptopropyl Trimethoxy silane | 41 |
| Phenyl Trimethoxy silane | 40 |
| Trimethoxy[2-(7-oxabicyclo[4.1.0]hept-3-yl)ethyl]silane | 39.5 |
| Methacryloxypropyl Trimethoxysilane | 28 |
| Vinyltrimethoxy Silane | 25 |
| Isobutyl Trimethoxy silane | 20.9 ± 3.0* |
| Hexamethyl Disiloxane | 15.9 |

*source http://www.chemspider.com/Chemical-Structure.79049.html

In terms of surface-treatment for colloidal silica a practical measure of hydrophilicity/hydrophobicity of an organosilanes is whether aqueous colloidal silica can be effectively treated by the organosilanes, and if the surface treated colloidal dispersion is stable in aqueous or semi-aqueous solution. After surface treatment with an organosilane or its oligomer upon an aqueous or semi-aqueous colloidal silica dispersion the hydrophilic surface treatment will allow for a stable dispersion, while an excessively hydrophobic surface treatment will show signs of instability such as gel or agglomeration.

For this work, it has been found that optimal results are obtained when the hydrophilic organosilane monomer unit exhibits a critical surface tension in the range of from about 40 mN/m to about 50 mN/m.

For this work, it has been found that optimal results are obtained when the hydrophobic organosilane monomer unit exhibits a critical surface tension in the range of from about 15 mN/m to about 39.5 mN/m.

The tenth aspect of the instant claimed invention is the brine resistant silica sol of the first aspect of the instant claimed invention wherein the hydrophilic organosilane monomer unit exhibits a critical surface tension in the range of from about 40 mN/m to about 50 mN/m. and the hydrophobic organosilane monomer unit exhibits a critical surface tension in the range of from about 15 mN/m to about 39.5 mN/m.

In terms of surface-treatment for colloidal silica a practical measure of monomeric hydrophilicity/monomeric hydrophobicity of an organosilanes is whether aqueous colloidal silica can be effectively treated by the organosilanes, and if the surface treated colloidal dispersion is stable in aqueous or semi-aqueous solution. It has been found that after surface treatment with an organosilane or its oligomer upon an aqueous or semi-aqueous colloidal silica dispersion the monomeric hydrophilic surface treatment will allow for a stable dispersion, while an excessively monomeric hydrophobic surface treatment will show signs of instability such as gel or agglomeration.

Oligomer preparation by prehydrolysis of organosilanes is done by following this experimental procedure. Distilled water is brought to pH 3 by addition of hydrochloric acid.

10.0 grams of glycidoxypropyltrimethoxysilane (KBM 403, Shin Etsu Corp.) and 1.0 gram of monomeric hydrophobic silane, including, but not limited to, one or more of methacryloxypropyltrimethoxysilane, isobutyltrimethoxysilane, vinyltrimethoxysilane, trimethoxy[2-(7-oxabicyclo[4.1.0] hept-3-yl)ethyltrimethoxysilane and hexamethyldisiloxane (KBM 103, Shin Etsu Corp.) and 1.0 gram prepared pH 3 water are added to a 20 mL scintillation vial. A molar shortage of water is chosen to encourage linear polysiloxane oligomer formation. The combination is mixed by shaking the vial, resulting in a hazy mixture/emulsion which changes to clear and transparent upon standing for approximately 10 minutes. Transition from hazy to transparent is attributed to hydrolysis of Si—O—CH$_3$ species to Si—OH species that are more compatible with water. The mixture is allowed to stand for a period of 30 minutes at room temperature to form organosilane oligomer species by condensation of Si—OH groups to form Si—O—Si polysiloxane bonds. Formation of polysiloxane oligomers is accompanied by an increase in viscosity as measured by Ubbeholde viscometer. Formation of polysiloxane oligomers is also verified by FTIR as measured by ThermoFisher Nicolet iS5 spectrometer. Oligomer formation is confirmed and monitored by reduction/loss of absorption peak at 1080 cm$^{-1}$ assigned to Si—O—C stretching vibration and appearance and broadening of Si—O—Si absorption peaks in the 980 cm$^{-1}$ region.

This general method of prehydrolysis/condensation is followed for each combination of monomeric hydrophilic and monomeric hydrophobic organosilanes as well as comparative examples where oligomer formation was desired. Some organosilane combination preparations resulted in precipitates or gelled mixtures and were not used further.

It has furthermore been observed in model testing that crude oil can be more efficiently removed from downhole rock surfaces by using fluid systems formulated with such brine-resistant colloidal silica.

EXAMPLES

Polysilane Oligomer Premix Preparation
  Make pH 3 water from 100 g deionized water and 3-4 drops of 10% HCl while mixing and monitoring the pH using a calibrated pH meter. Continue until the pH of the mixture is measured to be 3.0 Add the silanes in the required proportions to form a mixture of silanes, then add pH 3 water to the silane combination and mix with magnetic stirrer/stir bar in a 100 mL polypropylene beaker.
  The mixture will appear hazy at first, then it should change appearance and clarify to a visually clear, transparent solution. After the clear, transparent mixture is achieved, wait at least 30 minutes to allow for the oligomerization reaction to proceed to completion. Oligomer formation was confirmed by Gel Permeation Chromatography and Fourier Transform Infrared Spectroscopy.
  Wait 30 minutes with each mixture to allow for oligomerization reaction before using it to surface treat aqueous silica sols. After 30 min the silane oligomer mixture can be used to surface treat aqueous silicasols.
  Polysiloxane oligomer preparations are observed for clarity, gelation/polymerization, or formation of agglomerations/white precipitate. Preparations resulting in clear liquids or clear slight viscous liquids are listed as "OK" and deemed usable. Those preparations showing gelation/polymerization agglomeration, or white precipitate formation are concluded to be unusable and are listed as "Fail". It is believed that oligomer preparation without sufficient monomeric hydrophilic content are prone to failure in an aqueous or semi aqueous environment. It is understood that for the data reported in the following tables, when an Example "fails" the Brine Stability Test, that the Example is a Comparative Example and not an Example of the Instant Claimed Invention.

Surface Functionalization Method of Aqueous Silicasols Standard Formula, use for all Silica Sols created

| | |
|---|---|
| ST-32C Aqueous Silica Sol | 59.28 |
| DI water | 27.98 |
| Ethylene Glycol | 9.85 |
| Silane Oligomer Premix | 2.9 |
| Total Parts | 100.01 |

Add aqueous silica sol ST-32 C or E11126, "DI" (deionized) water, Ethylene Glycol and a stir bar to a glass reactor 77 mL volume and bring the silica sol to 50° C. A 10 mL addition funnel is fitted to the reactor and used to add the polysiloxane oligomer preparations dropwise while the reaction mixes until finished. Surface treatment is allowed to react with silica surfaces for a period of 2 hours.

Preparation of E11125 Surface Functionalized Colloidal Silica

A Polysiloxane oligomer premix was prepared from 10 parts glycidoxypropyltrimethoxysilane, 5 parts vinyltrimethoxysilane, and 1 part pH3 water (prepared from distilled water and 10% HCl brought to pH 3 using a calibrated pH meter) by mixing these components and allowing the mixture to react at room temperature for a period of about 30 minutes. A solution of colloidal silica is prepared for surface functionalization by adding 59.28 g ST-32C alkaline colloidal silica from Nissan Chemical America Corp. to a 250 glass vessel and further adding 27.98 g distilled water, and 9.85 g Ethylene Glycol cosolvent (Sigma Aldrich corp.). This mixture is brought to 50° C. while mixing by magnetic stirring with a magnetic stir bar & stir plate.

A portion of the GPTMS/VTMS Polysiloxane oligomer premix (2.9 grams) is placed in an addition funnel and then added dropwise to the stirring colloidal silica mixture. After the polysiloxane oligomer preparation solution addition is finished the solution is allowed to react at 50-55° C. for a period of 3 hours.

Preparation of E11126 Surface Functionalized Colloidal Silica

A solution of colloidal silica is prepared for surface functionalization by adding 52.68 g ST-025 acidic colloidal silica available from Nissan Chemical America Corp. to a 250 glass vessel and further adding 36 g distilled water, and 8 g Ethylene Glycol cosolvent (Sigma Aldrich corp.). This mixture is brought to 50° C. while mixing by magnetic stirring with a magnetic stir bar & stir plate.

Glycidoxypropyltrimethoxysilane (3.2 grams) is placed in an addition funnel and then added dropwise to the stirring colloidal silica mixture. After the monomeric organosilane addition is finished the solution is allowed to react at about 50° C.-55° C. for a period of 3 hours.

Brine Stability Testing
API Brine by Visual Observation:
  A 10 wt % API Brine solution is prepared by dissolving 8 wt % NaCl (SigmaAldrich) and 2 wt % CaCl$_2$ (Sigma Aldrich) in distilled water. Testing for Brine resistance is done by placing 1 gram of example silica sol into 10 grams of API Brine Solution. Stability observations are performed at standard brine exposure periods of 10 minutes and 24 hours. These observations include the clarity and transparency of the silica sol. The results of these observations are recorded at these times. Silica sol solutions that are stable to Brine exposure will remain clear and transparent/opalescent while unstable examples become visibly hazy and opaque after brine exposure or undergo gelation.

Artificial Seawater by Visual Observation

Artificial seawater is prepared by dissolving Fritz Pro Aquatics RPM Reef Pro Mix (Fritz Industries, Inc.) at 6 wt % in distilled water. Testing for Brine resistance is done by placing 1 gram of example silica sol into 10 grams of Artificial Seawater. Stability observations are performed at standard brine exposure periods of 10 minutes and 24 hours. These observations include the clarity and transparency of the silica sol. The results of these observations are recorded at these times. Silica sol solutions that are stable to Brine exposure will remain clear and transparent/opalescent while unstable examples become visibly hazy and opaque after brine exposure or undergo gelation.

API Brine Resistance Test by Use of a Turbidimeter

Reference: US EPA 180.1 Determination of Turbidity by Nephelometry

A difference between this test and the US EPA 101.1 test is that in the test used in this patent application, step 11.2 is not followed:

Step 11.2 reads as follows: Turbidities exceeding 40 units: Dilute the sample with one or more volumes of turbidity-free water until the turbidity falls below 40 units. The turbidity of the original sample is then computed from the turbidity of the diluted sample and the dilution factor. For example, if 5 volumes of turbidity-free water are added to 1 volume of sample, and the diluted sample showed a turbidity of 30 units, then the turbidity of the original sample is 180 units.

For this work, the actual ("raw") value of turbidity is recorded, whether it is above, below or equal to 40.

Test solutions/surface treated silicasols are tested for Brine resistance by Turbidimetry.

A calibrated Hach 2100AN Turbidimeter is used to measure Turbidity in units of NTU (Nephelometric Turbidity Units).

Test solution amounts of 3.0 g are placed into standard turbidity test tubes of approximately 30 ml.

Twenty-seven grams (27 g) of 10% API brine (8 wt % NaCl, 2 wt % $CaCl_2$) are added to the test tube and the mixture inverted three times to mix test solution and brine. Test solution concentrations are therefore 10 wt % in API Brine.

Sample test tubes are inserted into the Turbidimeter and an initial measurement of turbidity is taken immediately, followed by a turbidity measurement after 24 hours.

A change in turbidity of more than 100 NTU leads to the conclusion that the silica sol is not brine stable. Conversely a change in turbidity of less than 100 NTU after API brine exposure leads to the conclusion that the silica sol is brine stable.

| Component | Examples | | | | | | |
|---|---|---|---|---|---|---|---|
| | 1212-1 | 1212-2 | 1212-3 | 1212-4 *** | 1212-5 | 1212-6 | 1212-7 |
| Glycidoxypropyl-trimethoxysilane | 3.33 | 3.33 | 3.33 | 3.33 | | 3.33 | 3.33 |
| Vinyltrimethoxy-Silane | 1.67 | 0.67 | 0.33 | 1.67 | | | |
| Trimethoxy[2-(7-oxabicyclo[4.1.0]hept-3-yl)ethyl]silane | | | | | 3.33 | 1.67 | 0.67 |
| Hexamethyldisiloxane | | | | | | | |
| pH 3 water | 0.33 | 0.33 | 0.33 | | 0.33 | 0.33 | 0.33 |
| Total parts, oligomer | 5.33 | 4.33 | 4.00 | 5.00 | 3.67 | 5.33 | 4.33 |
| Polysiloxane Oligomer Preparation observations | OK | OK | OK | N/A (no oligomer prepared) | Fail | OK | OK |
| Treated silicasol observations, Stable? | OK | OK | OK | Fail | Fail | OK | OK |
| 10% API Brine, 10 minutes | Pass | Pass | Pass | N/A | N/A | Pass | Pass |
| 10% API Brine, 24 hours | Pass | Pass | Pass | N/A | N/A | Pass | Pass |
| Artificial Seawater, 10 min | Pass | Pass | Pass | N/A | N/A | Pass | Pass |
| Artificial Seawater, 24 hours | Pass | Pass | Pass | N/A | N/A | Pass | Pass |
| Turbidity (NTU) initial | 28.4 | 26.6 | 25.5 | N/A | N/A | 28.7 | 28.6 |
| Turbidity (NTU) 24 hours | 43.6 | 27 | 29 | N/A | N/A | 30.6 | 28.7 |
| Change in Turbidity (NTU) | 15.2 OK | 0.4 OK | 3.5 OK | N/A | N/A | 1.9 OK | 0.1 OK |

*** Polysiloxane oligomer not prepared, monomeric silanes used to surface treat silicasol without oligomerization (comparative example). Vinyltrimethoxysilane remains phase separated during surface functionalization reaction & does not react to silica sol surface.

| Component | 1212-8 | 1212-9 | 1212-10 | 1212-11 | 1212-12 | 1212-13 | 1212-14 |
|---|---|---|---|---|---|---|---|
| Glycidoxypropyl-trimethoxysilane | 3.33 | 3.33 | 3.33 | 3.33 | | | |
| Vinyltrimethoxy-Silane | | | | | 1.67 | 0.67 | 0.33 |
| Trimethoxy[2-(7-oxabicyclo[4.1.0]hept-3-yl)ethyl]silane | 0.33 | | | | 3.33 | 3.33 | 3.33 |
| Hexamethyldisiloxane | | 0.67 | 0.33 | 0.17 | | | |
| pH 3 water | 0.33 | 0.33 | 0.33 | 0.33 | 0.33 | 0.33 | 0.33 |
| Total parts, oligomer | 4.00 | 4.33 | 4.00 | 3.83 | 5.33 | 4.33 | 4.00 |
| Polysiloxane Oligomer Preparation observations | Fail | OK | OK | OK | Fail | Fail | OK |
| Treated silicasol observations, Stable? | OK | OK | OK | OK | Fail | Fail | Fail |
| 10% API Brine, 10 minutes | Pass | Pass | Pass | Pass | N/A | N/A | N/A |
| 10% API Brine, 24 hours | Pass | Pass | Pass | Pass | N/A | N/A | N/A |
| Artificial Seawater, 10 min | Pass | Pass | Pass | Pass | N/A | N/A | N/A |
| Artificial Seawater, 24 hours | Pass | Pass | Pass | Pass | N/A | N/A | N/A |
| Turbidity (NTU) initial | 26.4 | 25.7 | 23.9 | 27.6 | N/A | N/A | N/A |
| Turbidity (NTU) 24 hours | 26.4 | 25.7 | 83.1 | 27.8 | N/A | N/A | N/A |
| Change in Turbidity (NTU) | 0 OK | 0 OK | 59.2 OK | 0.2 OK | N/A | N/A | N/A |

| Component | EOR25 1A | EOR25 2A | EOR25 3A | EOR25 4A | EOR25 5A | EOR25 6A | EOR25 7A |
|---|---|---|---|---|---|---|---|
| Glycidoxypropyl-trimethoxysilane | 10 | 10 | 10 | 10 | 10 | 10 | 10 |
| Phenyltrimethoxy-Silane | 1 | 2 | 5 | | | | |
| Mercaptopropyl-trimethoxysilane | | | | 1 | 2 | 5 | |
| Methacryloxypropyl-trimethoxysilane | | | | | | | 1 |
| Isobutyltrimethoxy-Silane | | | | | | | |
| Vinyltrimethoxy-silane | | | | | | | |
| pH 3 water | 1 | 1 | 1 | 1 | 1 | 1 | 1 |
| Total parts, oligomer | 12 | 13 | 16 | 12 | 13 | 16 | 12 |
| Polysiloxane Oligomer Preparation observations | OK | OK | OK | Fail | Fail | Fail | OK |
| Treated silicasol observations, Stable? | OK | OK | OK | N/A | N/A | N/A | OK |
| 10% API Brine, 10 minutes | Pass | Fail | Fail | — | — | — | Pass |
| 10% API Brine, 24 hours | Pass | Fail | Fail | — | — | — | Pass |
| Artificial Seawater, 10 min | Pass | Pass | Fail | — | — | — | Pass |
| Artificial Seawater, 24 hours | Pass | Fail | Fail | — | — | — | Pass |
| Turbidity (NTU) initial | | 83.1 | 1180 | — | — | — | 25 |
| Turbidity (NTU) 24 hours | | 2334 | 1374 | — | — | — | 32.7 |
| Change in Turbidity (NTU) | | 2250.0 Fail | 194 Fail/Fail | — | — | — | 7.7 Pass |

| Component | EOR25 8A | EOR25 9A | EOR25 10A | EOR25 11A | EOR25 12A | EOR25 13A* | E11125 |
|---|---|---|---|---|---|---|---|
| Glycidoxypropyl-trimethoxysilane | 10 | 10 | 10 | 10 | 10 | 10 | 10 |
| Phenyltrimethoxy-Silane | | | | | | | |
| Mercaptopropyl-trimethoxysilane | | | | | | | |
| Methacryloxypropyl-trimethoxysilane | 2 | 5 | | | | | |
| Isobutyltrimethoxy-Silane | | | 1 | 2 | 5 | | |
| Vinyltrimethoxy-silane | | | | | | 1 | 5 |
| pH 3 water | 1 | 1 | 1 | 1 | 1 | 1 | 1 |
| Total parts, oligomer | 12 | 15 | 11 | 12 | 15 | 12 | 16 |
| Polysiloxane Oligomer Preparation observations | OK | OK | OK | OK | OK | OK | OK |
| Treated silicasol observations, Stable? | OK | OK | OK | OK | OK | OK | OK |
| 10% API Brine, 10 minutes | Pass | Fail | Pass | Fail | Fail | Fail | Pass |
| 10% API Brine, 24 hours | Pass | Fail | Pass | Fail | Fail | Fail | Fail |
| Artificial Seawater, 10 min | Pass | Pass | Pass | Pass | Fail | Fail | Pass |
| Artificial Seawater, 24 hours | Pass | Fail | Pass | Fail | Fail | Fail | Pass |
| Turbidity (NTU) initial | 23.6 | 23.3 | 28.2 | 126 | 831 | 19.4 | 28.4 |

-continued

| Component | EOR25 8A | EOR25 9A | EOR25 10A | EOR25 11A | EOR25 12A | EOR25 13A* | E11125 |
|---|---|---|---|---|---|---|---|
| Turbidity (NTU) 24 hours | 25.9 | 27 | 29.6 | 1767 | 932 | 19.4 | 49.4 |
| Change in Turbidity (NTU) | 2.3 Pass | 3.7 Pass | 1.4 Pass | 1641 Fail | 101 Fail | 0 Pass | 21 Pass |

*For the Example EOR25 13A the aqueous silicasol used in the surface treatment is E11126 (12-15 nm diameter acidic silicasol available from Nissan Chemical America) instead of ST-32C.

COMPARATIVE EXAMPLES

From Japanese Unexamined Patent Application Publication H3-31380,
"Coating Composition" assigned to
Daihachi Chem. Inc. Co., Ltd. {Japanese Patent Application No. H1-164505.}
Date of Application is 27 Jun. 1989.
Inventors are Noriaki Tokuyasu and Hiroshi Yamanaka.
Embodiments 1, 2, 3, 4 and 5 as well as Ref. Examples 1 and 2 are duplicated.
All examples gelled immediately upon mixing with brine, therefore, no 24-hour test data is recorded.

| Embodiment | Turbidity Initial (NTU) | Turbidity 10 min (NTU) |
|---|---|---|
| 1 | 998 | 1011 |
| 2 | 270 | 231 |
| 3 | 1463 | 1284 |
| 4 | 825 | 567 |
| 5 | 4666 | 4225 |
| Ref Ex 1 | 1539 | 1051 |
| Ref Ex 2 | 3078 | 2800 |

The disclosure in this patent application and all the examples within are meant for Sol-Gel coatings and are therefore substantially non-aqueous. As is to be expected, upon exposure to 10% API brine all these examples gelled/polymerized the silica immediately. Low turbidity numbers are from examples where the silica agglomerated and sedimented out of solution before the Turbidimeter was able to read a high NTU number.

It is believed, without intending to be bound thereby, that the Daihichi patent application examples all failed because they were too monomeric hydrophobic and essentially meant to be used in non-aqueous environments such as sol-gel coatings. In practice, there is no mixing of monomeric hydrophilic and monomeric hydrophobic silanes. The examples from this published Japanese Patent Application are designed to be useful silica sols for Sol-Gel coatings only.

In the claims, as well as in the specification above, all transitional phrases such as "comprising," "including," "carrying," "having," "containing," "involving," "holding," and the like are to be understood to be open-ended, i.e. to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain, using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention. All patents, patent applications, and references cited in any part of this disclosure are incorporated herein in their entirety by reference.

What is claimed is:

1. A method of recovering hydrocarbon from subterranean formation, comprising
  a) introducing to the subterranean formation a fluid comprising a brine resistant aqueous silica sol, wherein the brine resistant aqueous silica sol comprises silica particles surface functionalized with a polysiloxane oligomer comprising
    a monomeric unit of glycidoxypropyltrimethoxysilane and
    a monomeric unit selected from the group consisting of phenyltrimethoxysilane, methacryloxypropyltrimethoxysilane, isobutyltrimethoxysilane, vinyltrimethoxysilane, 2-(7-oxabicyclo[4.1.0]hept-3-yl) ethyltrimethoxysilane, and hexamethyldisiloxane;
  wherein the silica particles have an average diameter of between about 1 nm and about 100 nm, and
  wherein the brine resistant aqueous silica sol is stable to brine exposure under at least two of the tests selected from the group consisting of
    1) API Brine by Visual Observation,
    2) Artificial Seawater by Visual Observation, and
    3) API Brine Resistance Test by use of a Turbidimeter,
  wherein under the test of API Brine by Visual Observation or Artificial Seawater by Visual Observation, a stable aqueous silica sol does not become visibly hazy and opaque or undergo gelation at 10 minutes or 24 hours after brine exposure; and
  wherein under the test of API Brine Resistance Test by use of a Turbidimeter, a stable aqueous silica sol does not have a change in turbidity of more than 100 Nephelometric Turbidity Units at 24 hours after brine exposure compared to initial turbidity after brine exposure, wherein the monomeric unit of glycidoxypropyltrimethoxysilane and monomeric unit of phenyltrimethoxysilane, exhibit a critical surface tension in the range of from about 40 mN/m to about 50 mN/m; and wherein the methacryloxypropyl trimethoxysilane, isobutyl trimethoxysilane, vinyltrimethoxysilane, 2-(7-oxabicyclo[4.1.0]hept-3-yl)ethyltrimethoxysilane and hexamethyldisiloxane; exhibit a critical surface tension in the range of from about 15 mN/m to about 39.5 mN/m; and b) recovering the hydrocarbon from the subterranean formation.

2. The Method of claim 1, in which the silica particles are surface functionalized with the polysiloxane oligomer comprising the monomeric unit of glycidoxypropyltrimethoxysilane and the monomeric unit of phenyltrimethoxysilane.

3. The Method of claim 1, in which the silica particles are surface functionalized with the polysiloxane oligomer comprising the monomeric unit of glycidoxypropyltrimethoxysilane and the monomeric unit of methacryloxypropyltrimethoxysilane.

4. The Method of claim 1, in which the silica particles are surface functionalized with the polysiloxane oligomer comprising the monomeric unit of glycidoxypropyltrimethoxysilane and the monomeric unit of isobutyltrimethoxysilane.

5. The Method of claim 1, in which the silica particles are surface functionalized with the polysiloxane oligomer comprising the monomeric unit of glycidoxypropyltrimethoxysilane and the monomeric unit of vinyltrimethoxysilane.

6. The Method of claim 1, in which the silica particles are surface functionalized with the polysiloxane oligomer comprising the monomeric unit of glycidoxypropyltrimethoxysilane and the monomeric unit of 2-(7-oxabicyclo[4.1.0]hept-3-yl)ethyltrimethoxysilane.

7. The Method of claim 1, in which the silica particles are surface functionalized with the polysiloxane oligomer comprising the monomeric unit of glycidoxypropyltrimethoxysilane and the monomeric unit of hexamethyldisiloxane.

8. The method of claim 1, wherein the silica particles have an average diameter of between about 5 nm and about 30 nm.

9. The method of claim 1, wherein the silica particles have an average diameter of less than or equal to 25 nm.

10. The method of claim 2, wherein the silica particles have an average diameter of between about 5 nm and about 30 nm.

11. The method of claim 3, wherein the silica particles have an average diameter of between about 5 nm and about 30 nm.

12. The method of claim 4, wherein the silica particles have an average diameter of between about 5 nm and about 30 nm.

13. The method of claim 5, wherein the silica particles have an average diameter of between about 5 nm and about 30 nm.

14. The method of claim 6, wherein the silica particles have an average diameter of between about 5 nm and about 30 nm.

15. The method of claim 7, wherein the silica particles have an average diameter of between about 5 nm and about 30 nm.

* * * * *